United States Patent
Sliger

[15] 3,681,632
[45] Aug. 1, 1972

[54] CONSTANT SPEED DC MOTOR WITH INTERIOR FIELD

[72] Inventor: Dale E. Sliger, 1810 Citrus Ave., Redlands, Calif. 92373

[22] Filed: Jan. 18, 1971

[21] Appl. No.: 107,122

[52] U.S. Cl. .................... 310/46, 310/67, 310/144
[51] Int. Cl. ............................................ H02k 47/00
[58] Field of Search .......... 310/144, 46, 67, 266, 154, 310/156

[56] References Cited

UNITED STATES PATENTS

| | | | |
|---|---|---|---|
| 3,539,846 | 11/1970 | Jewell | 310/46 |
| 2,624,017 | 12/1952 | Putnocky | 310/46 |
| 3,050,647 | 8/1962 | Winther | 310/67 |
| 2,929,944 | 3/1960 | Shewmon | 310/67 |
| 3,546,507 | 12/1970 | Wengel | 310/46 |
| 2,273,840 | 2/1942 | Dever | 310/67 |

Primary Examiner—J. D. Miller
Assistant Examiner—R. Skudy
Attorney—Wm. Jacquet Gribble

[57] ABSTRACT

A revolving armature surrounds a fixed field with a commutator having segments equal to armature winding groups. The multiple cores of the revolving armature are movable within the armature coil windings such that centrifugal force displaces the core pieces from the field with a consequent weakening of the armature flux. Biasing springs oppose the outward movement of the core pieces. The spring bias is adjustable so the desired constant speed of the DC motor may be calibrated such that a balance point is achieved between that rotation speed causing the centrifugal force urging the cores away from the armature and the spring bias.

8 Claims, 4 Drawing Figures

INVENTOR.
DALE E. SLIGER

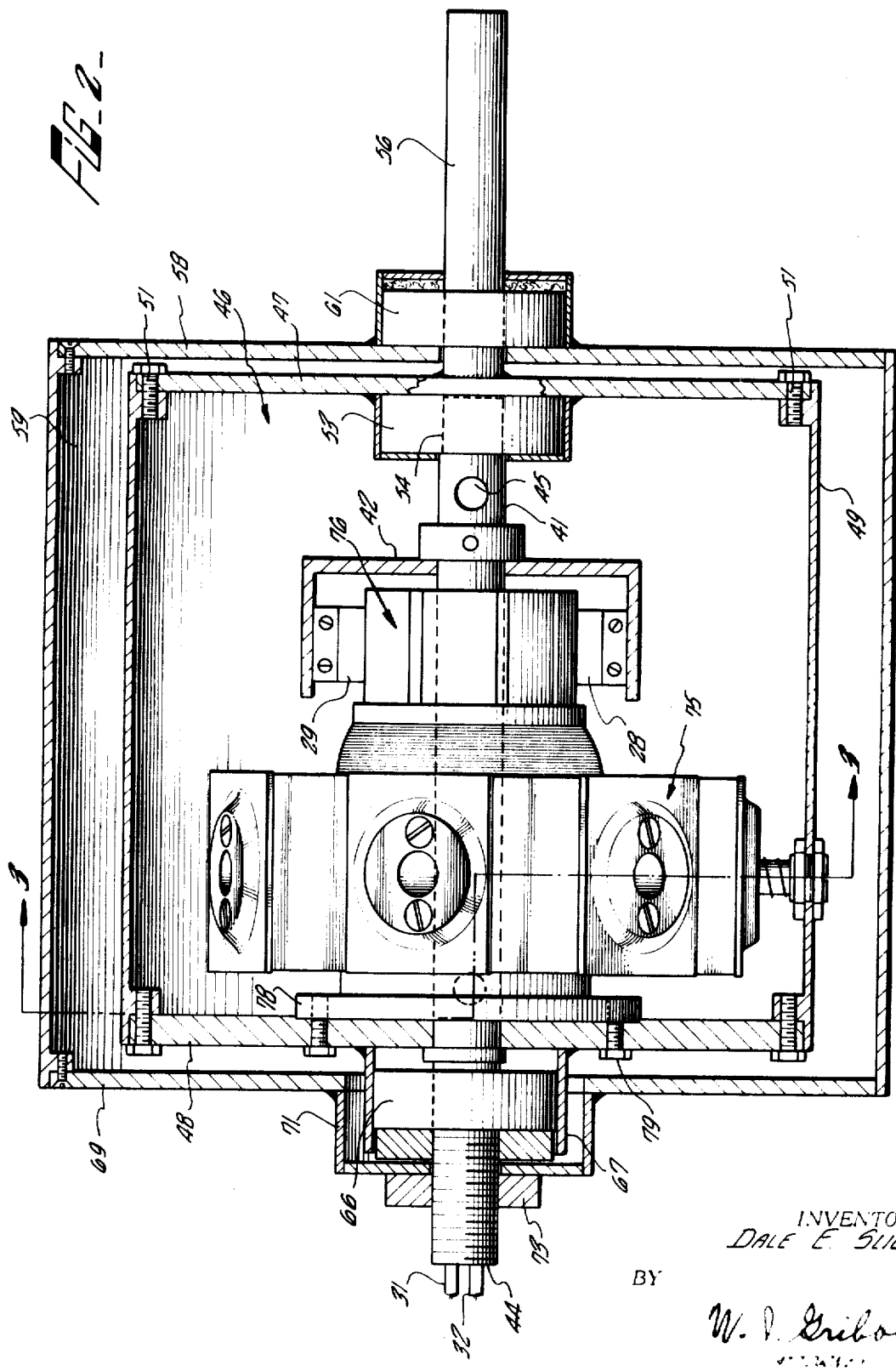

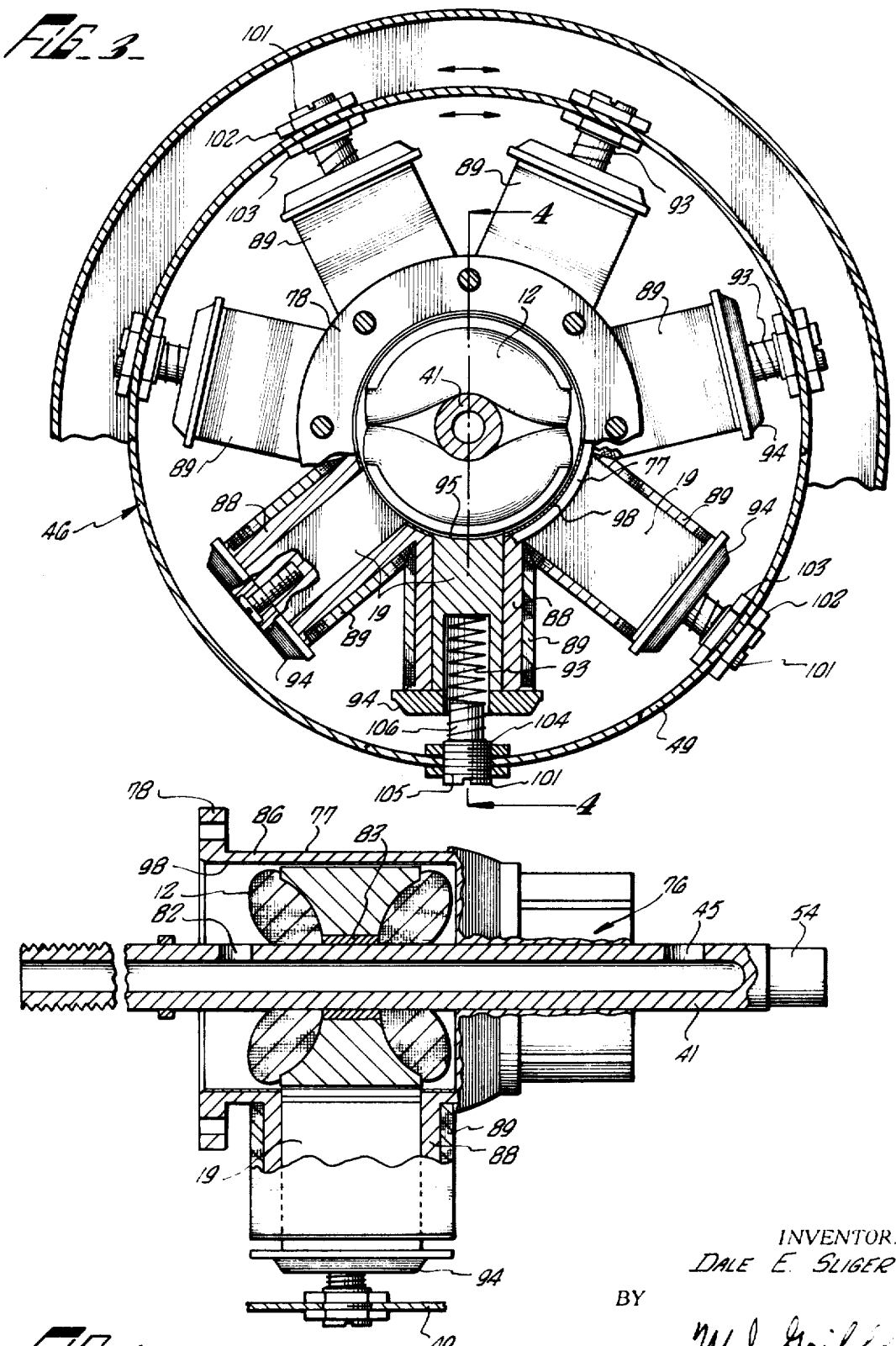

CONSTANT SPEED DC MOTOR WITH INTERIOR FIELD

BACKGROUND OF THE INVENTION

The increasing automated nature of technology has led to greater utilization of DC motors for control mechanisms and prime power sources. Speed calibration of DC motors as contrasted with AC motors has been difficult. Many electrical and electronic circuits have been devised to change armature input or field strength to adjust for load and no-load conditions on the motor or to compensate for current fluctuations through the motor. Many of these electrical and electronic devices have proved incapable of fine adjustment or have proved too delicate for use in particular applications. I have invented electrical motor apparatus employing a mechanical principle for achieving constant speed which overcomes the objections to previous speed control apparatuses and which is easily adjusted.

SUMMARY OF THE INVENTION

The invention contemplates a constant speed DC motor which comprises a ring armature revolving about a fixed interior field and a commutator having a number of segments equal to the number of armature winding groups. Preferably the armature has seven winding groups and seven commutator segments. The armature windings associated with each group surround a core piece radially slidable with respect to the axis of rotation of the armature. The armature is supported in a surrounding cradle and adjustable biasing springs extend between the cradle and the core pieces to bias the pieces toward the interior field. As the speed of the motor tends to increase, the centrifugal force urges the core pieces against the biasing springs, tending to increase the air gap between pieces and field such that the armature flux is reduced, resulting in a tendency to reduce the motor speed.

Since the centrifugal force engendered by the rotating armature is constant for a given RPM, the speed at which the core pieces tend to overcome the biasing springs is a constant one and the speed of the motor can be maintained constant as desired by proper adjustment of each of the biasing springs extending between the cradle and the core pieces.

The apparatus of the invention therefore achieves the objectives of mechanically induced control of motor speed, simple adjustment of the constant speed desired and reduction of basic costs of fabrication.

These and other advantages of the invention are apparent from the following detailed description and drawing:

BRIEF DESCRIPTION OF THE DRAWING

FIG. 2 is a longitudinal cross-section of an alternate embodiment of the invention having an armature ring with seven winding groups;

FIG. 3 is a fragmentary transverse section taken along line 3—3 of FIG. 2 and partly broken away; and FIG. 4 is a fragmentary longitudinal section showing the field windings and wiring leads.

In the several Figures like parts are identified by like numerals.

DESCRIPTION OF THE PREFERRED EMBODIMENTS

Figure 1:
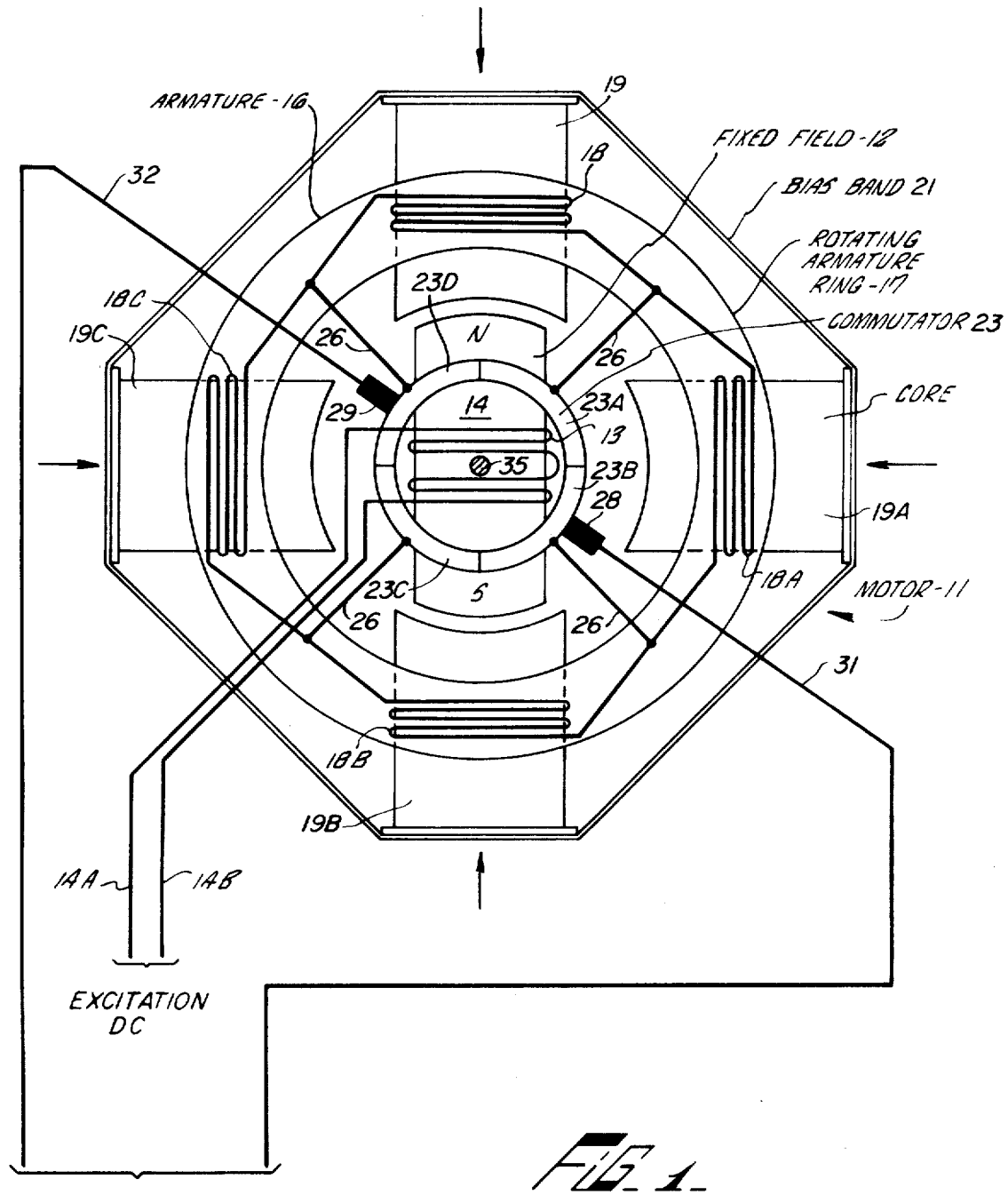
FIG. 1 is a wiring diagram of a separately excited DC motor in accordance with the invention.

In the FIG. 1 diagram a constant speed DC dynamo such as a motor 11 has a fixed field 12 having windings 13 connected by leads 14A, 14B to an excitation source not shown. Preferably the source is constant. A ring armature 16 has a rotating ring 17 carrying series connected windings 18, 18A, 18B and 18C, in clockwise order. Each coil surrounds a displaceable core piece 19, 19A, 19B and 19C, respectively, slidable radially in the coil with respect to the ring. A biasing band 21 encompasses the core pieces, thrusting them toward the center of rotation of the ring.

A segmented commutator 23 has segments 23A, 23B, 23C and 23D matching in number the coil windings, each segment being connected between adjacent windings to the commutator by a common lead 26, in conventional fashion. Commutator brushes 28, 29 are individually connected by leads 31, 32 to a source of impressed or working voltage (not shown). The brushes are conventionally positioned at right angles to, or offset from, the axis of the field flux indicated by the North and South polarity indices of the fixed field 12.

In operation the field is fixed by a rigid shaft 35, central of FIG. 1. The field is excited as current is applied to leads 14A, 14B. As the working or impressed current is applied through leads 31, 32, through the brushes and commutator to the armature coils, armature rotation, including the ring 17, is induced. After initial windup to the design rate of rotation the centrifugal force of the core pieces 19A–19C tends to displace the core pieces outwardly away from the field through the coils 18–18C, reducing the reaction of the field flux on the armature, tending to reduce the armature speed such that the speed remains constant in accordance with the calibration imposed by proper tensioning of bias band 21.

The control of the motor speed is mechanically derived from the centrifugal force imparted by armature rotation. Speed control is a factor of the actual rate of rotation of the motor. While separately excited embodiments are shown, the concept of the invention is equally adapted to shunt and series wound dynamos as well.

FIGS. 2, 3 and 4 illustrate an embodiment of the invention having an odd number of armature coils and a matching number of commutator segments. Like the diagrammatically illustrated embodiment of FIG. 1, the embodiment of FIG. 2 has a fixed hollow shaft 41 supporting a fixed field 12 and a brush carrier 42. Leads 31, 32 of the impressed voltage enter exterior end 44 of shaft 41 and emerge through an aperture 45 to connect to the brushes 28, 29, which are held by carrier 42. An armature frame 46 has circular end plates 47, 48 to which a cylindrical drum 49 is attached by suitable threaded fasteners 51. A bearing 53, fixed to end plate 47, carries the internal end 54 of hollow shaft 41. A power take-off shaft 56 is fixed to end plate 47 and extends outwardly through a front wall 58 of the motor case 59. A bearing 61 supported by front wall 58 journals the output shaft such that the frame 46 is supported at one end by shaft 56 and at the other end by a bearing 66 held in a housing 67 on end plate 48 of the cradle and the supporting shaft 41.

The motor case 68 has a rear wall 69 with an exterior collar 71 to which the threaded end 44 of the field shaft 41 is clamped by a lock nut 73.

A ring armature 75 has a commutator hub 76 and a core piece carrier 77 which are connected by a flange 78 to end plate 48 of the armature frame by suitable threaded fasteners 79. The commutator hub is journalled on shaft 41 by a conventional bushing or bearing 81.

Shaft 41 further has an aperture 82 (see FIG. 4) through which the excitation leads 14A, 14B emerge from the shaft hollow to be connected to the field windings of fixed field 12. The windings and the mandrel are suitably insulated from the shaft, as by an insulated bushing 83.

As can best be seen from FIGS. 3 and 4, the core piece carrier 77 has a cylindrical portion 86 from which a plurality of radial coil cores 88 extend. Seven coil cores 88 are equally spaced about the periphery of the core piece portion 86, each core being the mandrel for an armature coil winding 89. Each coil winding 89 is connected to the commutator as indicated in FIG. 1 and the windings are connected in series about the ring armature.

The cores are rectangular in cross-section and each contains a core piece 19 slidable radially within the core. Conventional wire and insulation are utilized in the field and armature windings, and further detailing is therefore not disclosed.

The biasing effect of the band 21 of the embodiment of FIG. 1 is accomplished in the embodiment of FIG. 2 by a plurality of compression springs 93. Each core piece is biased by a compression spring 93 to an inward position limited by core piece cap 94 such that the arcuate inner end 95 of each core piece coincides with the position of a cylindrical shield 98 (see FIG. 3). The shield is of a paramagnetic material and is believed to act to distribute uniformly the flux engendered by the armature windings. Operation of the motor is improved by the use of the shield for reasons not fully understood.

Each biasing spring 93 is anchored at its outer end on a stud 101 fixed to cradle drum 49 by lock nuts 102, 103. The spring thrusts against the shoulder 104 of the stud formed at the reduction of the threaded shank 105 to a stub shank 106. Shank 106 supports the outer end of the spring. Springs 93 are adjustable as to tension by means of the studs 101. The centrifugal force necessary to displace the core pieces 19 from the field is therefore regulated by the inner or outer radial positions of the studs 101 with respect to the core pieces 19.

Commutator 76 is divided into seven segments, matching in number the coils of the ring armature. The impressed current is supplied to the armature coils in conventional fashion by the brushes 28, 29, the current distribution to individual coils varying with the position of the brush on the commutator section.

While the rectangular core pieces and coil cores have proved to be effective, the invention does not preclude use of radially displaceable core pieces of differing cross-sectional configurations. The illustrative embodiments have disclosed armature coils numbering four and seven about the ring, the commutator having a like number of electrically separate segments, whether or not the segments are further divided physically for adaptation to conventional processes.

Other variations within the scope of the invention will occur to those skilled in this particular art, and therefore it is desired that the invention be measured by the appended claims rather than the illustrative embodiments disclosed herein.

I claim:

1. A constant speed direct current motor comprising a static field, a rotating armature surrounding the field, a plurality of armature coils, a core piece within each coil, guide means on the armature restraining each core piece for radial motion with respect to the field in response to centrifugal moment of each core piece as the armature rotates, means inhibiting each core piece from radial motion away from the field, power take-off means rotated by the armature, a frame rotatable with the armature, a compression spring extending between each core piece and the frame urging the core piece toward the field against the centrifugal force engendered by armature rotation, and means for varying the spring pressure against the core piece.

2. A constant speed direct current motor in accordance with claim 1 further comprising an armature ring supporting the armature coils, a commutator ring carried by the armature ring, and contact brushes adapted to transfer electrical power to the armature through the commutator.

3. A compression member or constant speed direct current motor in accordance with claim 2 wherein the commutator comprises a plurality of segments equal in number to the plurality of armature coils.

4. A constant speed direct current motor in accordance with claim 1 wherein the inhibiting means comprises an elastic band bearing upon the radially outward portion of each core piece.

5. A constant speed direct current motor in accordance with claim 1 further comprising an armature ring, a segmented commutator ring, a plurality of arcuately spaced coil cores extending radially from the armature ring, each of said core pieces being radially movable within a coil core, a static shaft supporting the field, electrical connectors extending through the shaft to the field and armature, brush supports on the static shaft, and a frame on the armature ring supporting the core pieces inhibiting means, said frame carrying said power take-off means.

6. A constant speed direct current motor in accordance with claim 6 wherein the commutator comprises a plurality of segments equal in number to the plurality of armature coils.

7. A constant speed direct current motor in accordance with claim 6 wherein the inhibiting means comprises a plurality of compression springs, a compression spring extending between each core piece and the frame urging the core piece toward the field against the centrifugal force engendered by armature rotation, and means on the frame for varying the spring pressure against the core piece.

8. A constant speed direct current motor comprising a motor case, end plates on the case, a power take-off axle journalled in one end plate, a static shaft fixed to the other end plate, a static field supported on the shaft, an armature frame journalled on the shaft at one end and supporting the shaft at the other shaft end, said take-off axle supporting the frame at said other shaft end, electrical leads extending from the field through the shaft externally of the case, brush carriers fixed to the shaft, a ring armature journalled on the shaft at one of the ring ends and fixed to the frame at the other ring end, a metal shield on the armature ring interior between ring and field, a commutator on the ring armature, a plurality of armature cores, armature coils about each core linked in series to the commutator, a core piece slidable in each armature core toward and away from the field, a spring extending from the frame to each core piece biasing each core piece toward the field, brushes on the carriers in contact with the commutator, and electrical leads from the brushes extending through the shaft exteriorly of the motor housing.

* * * * *